June 13, 1967 T. J. ROBARGE 3,324,572
ELECTRICAL INSTRUCTION KIT AND CONNECTOR THEREFOR
Filed Aug. 10, 1964
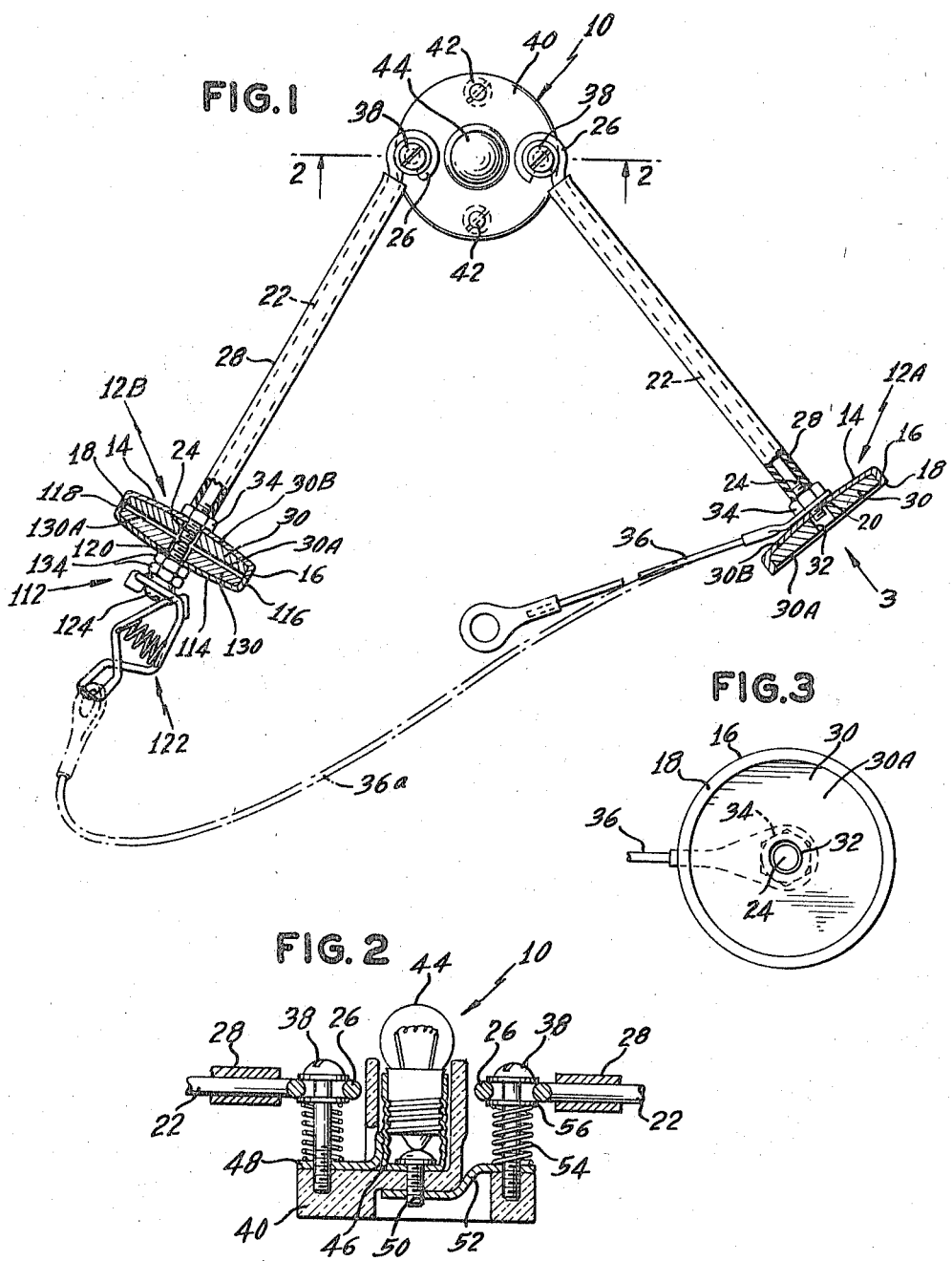
INVENTOR.
Thomas J. Robarge
BY
ATTORNEY

United States Patent Office 3,324,572
Patented June 13, 1967

3,324,572
ELECTRICAL INSTRUCTION KIT AND CONNECTOR THEREFOR
Thomas J. Robarge, 5 Birchwood Court, Mineola, N.Y. 11501
Filed Aug. 10, 1964, Ser. No. 388,595
2 Claims. (Cl. 35—19)

This invention relates to an electrical instruction kit and, in particular, to a novel electrical connector therefor.

The present invention has as its purpose to provide an electrical construction kit that will enable one to teach children of school age and younger to learn and quickly grasp the fundamentals of electricity by actually enabling them to construct and put together working electrical systems involving simple as well as complex circuits. In the past, such kits have been cumbersome to use because they required special perforated test boards or complicated connecting structures and, at times, terminal posts non-removably fixed in place on peg boards. Because of these prior art structures requiring mechanical skill to assemble and dissemble, their use was limited to only those older pupils who had the sufficient mechanical adeptness to operate them. The making of an electrical circuit and the disassembly of the same required more than the simple mind of a child could fathom.

Accordingly, it is the purpose of this invention to provide an instruction kit that will enable the teaching of the magic fundamentals of electricity to young children, a kit that includes parts that do not require mechanical skill for their use, that does not distract the attention of a child from the basic purpose of learning the fundamentals of elecricity by diverting their attention to the problems of assembling or disassemblying complex mechanical structures, a kit that eliminates the needs for a fixed surface or peg board on to which the parts must be assembled.

Hence, an object of this invention is to provide an electrical instruction kit that is extremely simple in its details, one that assembles so easily as to enthrall the student with its use, one that when the parts are properly positioned adjacent to each other, it may be said that they automatically assemble themselves into the proper circuit arrangement.

Another object of the invention is to provide an electrical connector of unique and yet inexpensive construction and which includes a magnet as an integral part thereof such that when the proper connectors are joined together, they hold the circuit until disassembled. In this regard, a feature of the invention resides in the utilization of magnets having a single pole in active working position whereby connectors joined in a circuit may be easily and simply separated for disassembly even by the youngest child by the application of a slight separating force.

Still another object of the invention resides in the structural arrangement of the details of the electrical connector so as to enable the same to be utilized without difficulty by even the youngest child capable of learning the foundamentals of electricity.

Other and further objects of this invention reside in the structures and arrangements hereinafter more fully described with reference to the accompanying drawing in which:

FIG. 1 is a top view of the inventive details of an electrical instruction kit according to the teaching of the invention, FIG. 2 is a cross-section of FIG. 1 taken along lines 2—2, and FIG. 3 is a view of FIG. 1 taken in the direction of line 3.

Reference is now made to FIG. 1 of the drawing wherein there is shown an indicating means generally identified by the numerat 10 and a plurality of electrical connectors generally identified by the numeral 12. To distinguish the right-hand connector from that on the left-hand side of FIG. 1, they are lettered A and B. The electrical connectors 12A and 12B illustrated in FIG. 1 are alike in construction. The connector 12 comprises a holder element constructed of an electrically conductive material and having a base wall 14. The holder has a flange 16 that extends in one direction away from one side of the wall 14. The flange 16 may be circular or non-circular in shape to result in a cup-shaped holder element in which the outer rim of the flange 16 terminates in a flat electrically conductive surface 18.

In the drawing, the annular shaped holder 14, 16 is provided with a threaded opening 20 to receive an electrical conductor 22 that is provided at one of its ends with a threaded surface 24 adapted to be releasably engaged with the thread 20. The opposite end of the electrical conductor 22 is provided with an incomplete or open loop shape 26 adapted to be engaged with any convenient connecting post. The electrical conductor 22 may be formed of a substantially rigid wire or rod material so that the same will not flex or bend easily and, therefore, it can be handled without difficulty by a young child whose finger dexterity is not fully developed. The length of the conductor 22 extending from the threaded end 24 to the loop shape 26 is fully covered and insulated by conventional insulating material 28.

Positioned within the encompassing confines of the flange 26 is a permanent plate magnet 30 having two different pole surfaces 30A and 30B. The magnet 30 has a circular outer periphery and may be said to be annular shaped, having a central opening 32 defined therein to permit the adjustment of the threaded end 24 of the electrical conductor 22 within the holder and the threaded wall 14. The magnet 30 may be adhesively secured in the cup-shaped holder against the interior surface of the wall 14. However, in practice, even when an adhesive is not employed, the attraction of the magnet at its one pole surface 30b to the surface of the wall 14 is sufficient to retain the same within the holder. It is noted that the thickness of the magnet 30 is less than the length of the flange 16 thereby being recessed within the holder and having its pole surface 30A spaced inward from the conductive surface 18 of the flange.

A lock nut 34 is threadedly engaged about the surface 24 of the electrical conductor 22 and is adapted to engage the adjacent face of the wall 14 to lock the rod 22 from movement relative thereto. The lock nut 34 may also be employed to securely connect an additional flexible conductor 36 in circuit with the connector 12 when so desired. The conductor 36 may be of any desired length as shown by the dash lines and depicted by the numeral 36a.

For purposes of the present invention, the instruction kit here disclosed is intended to include the novel electrical connector 12 wherein the parts are all of substantially rigid details such that none of the elements has a tendency to fall, bend or must be held by two hands when assembled by a very young child. For this reason the conductor 22 is made of substantially rigid rod-shaped material and insulated fully along its length. When the connector 12 is handled, it is grasped by the child about the length of the substantially rigid conductor 22. The remainder of the details of the connector 12 being substantially rigid do not have a tendency to fall and, therefore, can be moved easily by the child and connected simply to adjacent electrical structures.

This can be demonstrated by the connection of the conductor 22 to one of the terminal posts 38 of the indicating means 10. The terminal post 38 is simply a threaded screw or bolt that is engaged in an insulated base 40. If desired, the base 40 may be immovably secured or bolted to any convenient surface by the screws 42 shown in broken lines in FIG. 1. For purposes of explanation, the indicating means 10 here shown is in the form of a lamp 44 that is screwed into a socket 46 and connected in circuit with one of the binding posts 38 by a bracket 48 and to the other binding post 38 by a screw 50 and a bracket 52.

A substantially rigid loop shape 26 formed on the conductor 22 enables the same to be handled easily by a child to be looped about the binding post 38 at the opening of the incomplete loop of the connecting end 26. It is not even necessary thereafter for the child to operate the screw binding post 38 since the partially open loop 26 will be retained about the binding post and in contact therewith by the remaining spring 54 and washer 56. The substantially rigid electrical conductor 22 extends away from the indicating means 10 without sagging or falling. The outer surface of the flange 16 may rest on a table, the same table or surface on which the base 40 rests.

A number of the novel electrical connectors 12 may be joined together to complete a circuit to the indicating means 10 and with a source of electrical energy such as a low voltage battery, not shown. The novel electrical connectors are constructed so that the magnet 30 of each of them has a single one of its poles facing outward or in the direction of the surface 18. Therefore, if two connectors 12 are placed face to face adjacent to each other such that the surfaces 18 of the flanges 16 are aligned with each other and outward facing surface 30A of the magnets 30 of such connectors are of opposite polarity, such magnets will set up a magnetic field that will tend to attract the connectors 12 toward each other. This magnetic field will retain the adjacent rims 16 and flat conductive surfaces 18 of the adjacent connectors 12 in engagement with each other to complete a circuit thereacross.

In practice, it has been found that when utilizing the novel connector 12 while teaching young children the fundamentals of electricity, it is helpful to color the holders, comprising the wall 14 and flange 16, different colors. Thus, for example, the connectors 12 that have a magnet 30 whose surface 30A is of north polarity will have their holders colored green whereas those holders whose encompassed magnets 30 have their surface 30A of south polarity are colored red. It should be understood, however, that the specific color coding here used is not to be deemed a limitation upon the scope of the invention. Any other color coding can be employed.

Children recognize color differences and, therefore, when they place two connectors 12 in facing relationship with each other so that their surfaces 18 will engage each other to complete such a circuit, they will also learn that magnet surfaces of opposite polarity attract and those of similar polarity repel. In consequence, they learn to place color coded holders of opposite color in adjacent relationship with each other. Thus, when a connector 12 whose holder is colored green and one colored red are placed in facing relationship, the magnet surfaces 30A of opposite polarity attract each other to retain the surfaces 18 of their respective holders in engagement with each other.

This is illustrated in FIG. 1 wherein a holder 112 having a magnet 130 whose surface 130A is of one polarity is placed in adjacent relationship with a magnet 30 whose surface 30A is of opposite polarity of the electrical connector 12. The magnetic attraction set up between the magnets 30 and 130 retains the holders of each of the electrical connectors 12 and 112 together to complete a circuit across the engaged flat surfaces 18 and 118 of their engaged flanges 16 and 116. The child will quickly learn that it is necessary to place the holders of two electrical connectors 12 and 112 adjacent to each other whose facing magnetic surfaces are of opposite polarity. The magnets thereafter accomplish the function of actually pulling the flanges 16 and 116 toward engagement with each other and, thereafter, retain such engagement to complete a circuit thereacross. It is not necessary for the child to carefully manipulate the connectors 12 and 112 nor to screw, unscrew or operate any complex mechanisms. The connectors 12 and 112 may be disassembled from each other simply by tugging on each in opposite directions to overcome the slight magnetic force and attraction created between the opposite hole faces of magnets 30 and 130.

The connector 112 illustrates a slight modification of the electrical connector 12 in that an alligator clip generally identified by the numeral 122 is substituted for the normally substantially rigid electrical conductor 22. The alligator clip 122 is secured on one side of the wall 114 by a screw 124 that is adapted to be threadedly engaged in a threaded opening 120 defined in the wall 114. A pair of lock nuts 134 may be utilized to lock the screw 124 in its threaded engagement with the wall 114.

In practice, the electrical connector 12A shown on the right-hand side of FIG. 1 is adapted to complete its electrical circuit engagement at the surface 18 with a like connector 12 whose magnet 30 has its surface 30A of opposite polarity. In the connector 12A, the threaded end 24 of the conductor 22 is spaced inward from the surface 18 and, therefore, free of possible engagement with a like conductor of another connector that may be engaged with the surface 18. However, the connector 12B in the left-hand side of FIG. 1 has the threaded surface 24 adjusted such that it extends through the circular opening 32 of the magnet 30 and is in planar alignment with the flat conductive surface 18 of the flange 16. The threaded end 24 is locked in this position by the lock nut 34.

Thus, when the left-hand electrical connector 12 is engaged with the connector 112, a circuit is completed, not just across the engaged flat surfaces 18 and 118 of the flanges 16 and 116, but also across the engaged conductors 22 at its end 24 engaged with the screw 124 retaining the alligator clip 122 to the wall 114. Thus, it is possible to provide a multiple number of surface contacts and to illustrate this fact to the pupil by adjustment of the electrical conductor 22 relative to the wall 14 of the holder.

It may be seen from what has been described that the present invention discloses the use of an electrical connector 12 that incorporates a holder having a magnet whose working surface is of but a single polarity. In the holders described, it need not be necessary that the annular-shaped rim 16 be unbroken. It is possible that the flange 16 may be formed as a plurality of fingers extending away from the wall 14 rather than uninterrupted annular flange as shown. It will be clear that the combination of a substantially rigid insulated conductor 22 and connected holder 14, 16 result in a simple magnetic arrangement that is easy for a child to handle.

Moreover, when like connectors 12 and 112, having magnets of opposite polarity, are placed in facing relationship with each other, the child quickly learns that oppositely poled magnets attract the surfaces 18 pulling them toward each other and retaining them in engagement with each other until such time as the circuit is to be disassembled. Neither assembly nor disassembly requires any distracting effort upon the part of the child. More complicated circuits including the use of flexible conductors 36 or 36a may be devised by more advanced students.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In an electrical instruction kit, a pair of electrical connectors each adapted to be connected to the other to complete an electrical circuit therebetween, said electrical connectors each having a substantially cup-shaped electrically conductive holder the outer rims of which are adapted to be engaged with each other to complete an electrical circuit therebetween, a magnet in each of said holders, said magnets each having a surface of single polarity opposite from that of the other of said magnets whereby the attraction of said opposite poled magnet surfaces toward each other retains said outer rims of said holders in electrically conductive engagement with each other, and an electrically conductive connector on each of said holders extending in a direction away from the same and from the magnet in the respective holder, said electrical conductor connected with each one of said holders having a threaded end, said holders each having a threaded opening to receive the threaded end of said conductor for adjustment therein and relative to its respective holder, and a lock nut threadedly adjustable on the threaded end of said conductor to lock said conductor in its position of adjustment relative to its holder and to secure an electrical connector between said nut and its respective holder.

2. In an electrical instruction kit having a plurality of electrical connectors, each of said plurality of connectors comprising a magnet, an electrically conductive member having a wall, a substantially rigid electrical conductor extending from one side of said wall, and a flange extending from the other side of said wall and encompassing a portion of said magnet when the same is retained against said wall on the side of said flange, the length of said flange being greater than the thickness of said magnet to extend therebeyond when said magnet is retained against said wall, respective flanges of each of said plurality of connectors being identical and each having a flat annular electrically conductive surface remote from said wall and spaced beyond said magnet, a portion of said plurality of connectors having the respective magnet's positioned so that one pole is remote from said wall, and the remaining portion of said plurality of connectors having the respective magnets positioned so that the opposite pole is remote from said wall, whereby connectors having magnets of opposite polarity may be connected together with said flat conducting surfaces in abutting relationship with each other to provide an electrical conduction path between said connectors, such substantially rigid electrical conductor being a rod having a threaded connecting means at one end thereof and connecting means at the other end thereof, said wall having an engaging thread defined therein for releasable engagement of said substantially rigid conductor with said wall and for adjustment relative thereto, means on said substantially rigid conductor insulating the same between said connecting means on the opposite ends thereof, and an adjustable nut on said threaded connecting means of said rigid conductor, said nut being adjustable along the thread of said conductor relative to the one side of said wall to secure an electrical connector therebetween.

References Cited

UNITED STATES PATENTS

| | | | |
|---|---|---|---|
| 2,592,552 | 4/1952 | De Florez | 35—19 |
| 2,884,698 | 5/1959 | Wursch | 33—75 |
| 3,009,225 | 11/1961 | Budreck | 24—201 |

FOREIGN PATENTS 166,680   4/1959   Sweden.

EUGENE R. CAPOZIO, *Primary Examiner.*

H. S. SKOGQUIST, *Assistant Examiner.*